US011429164B1

(12) United States Patent
McKittrick et al.

(10) Patent No.: US 11,429,164 B1
(45) Date of Patent: Aug. 30, 2022

(54) COOLING SYSTEM FOR AN INFORMATION HANDLING SYSTEM

(71) Applicant: Dell Products L.P., Round Rock, TX (US)

(72) Inventors: Allen B. McKittrick, Cedar Park, TX (US); Qinghong He, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/172,685

(22) Filed: Feb. 10, 2021

(51) Int. Cl.
*G06F 1/20* (2006.01)
*G06T 1/20* (2006.01)

(52) U.S. Cl.
CPC ............. *G06F 1/203* (2013.01); *G06T 1/20* (2013.01)

(58) Field of Classification Search
CPC ...... G06F 1/20; G06F 1/206; G06F 2200/201; G06F 1/203; H05K 7/20154; H05K 7/20172; H05K 7/20145; H05K 7/20727; H05K 7/20809; H05K 7/20136; H05K 7/2039; H05K 7/20; H05K 7/20336; F28D 2021/0028; F28D 15/0275
See application file for complete search history.

(56) References Cited

U.S. PATENT DOCUMENTS

| | | | | |
|---|---|---|---|---|
| 5,788,509 A * | 8/1998 | Byers | ...................... | G06F 1/184 361/788 |
| 7,230,827 B2 * | 6/2007 | Sun | ........................ | G06F 1/181 312/223.1 |
| 10,423,200 B1 * | 9/2019 | North | ................... | H05K 7/20336 |
| 2004/0105233 A1 * | 6/2004 | Lai | ........................ | H05K 7/202 361/695 |
| 2006/0232934 A1 * | 10/2006 | Kusamoto | ............... | G06F 1/203 361/697 |
| 2009/0056911 A1 * | 3/2009 | Hongo | ................... | H01L 23/427 165/80.4 |
| 2010/0061052 A1 * | 3/2010 | Chung | ....................... | G06F 1/20 361/679.47 |
| 2011/0279974 A1 * | 11/2011 | Fujiwara | ............ | H05K 7/20154 361/692 |
| 2011/0279977 A1 * | 11/2011 | Tanaka | ..................... | G06F 1/203 361/697 |
| 2011/0310557 A1 * | 12/2011 | Ooe | ......................... | G06F 1/203 361/692 |
| 2011/0310561 A1 * | 12/2011 | Hata | ................... | H05K 7/20963 361/697 |

(Continued)

*Primary Examiner* — Michael A Matey
(74) *Attorney, Agent, or Firm* — Norton Rose Fulbright US LLP (57) ABSTRACT

A compact and mobile information handling system, such as a tablet, including a thermally-configured chassis having one or more fans and one or more inlets for directing air flow directly across components of the information handling system to cool such components by convection. Such fans may additionally direct air flow across a heat exchanger and/or heat pipe coupled to heat-producing components like a central processing unit and/or graphics processing unit. Components of the information handling system may be positioned on the thermally-configured chassis and used to efficiently direct the air flow throughout the chassis without requiring additional space. The inlets and outlets may be positioned on one or more sides of the information handling system.

20 Claims, 8 Drawing Sheets

(56) References Cited

U.S. PATENT DOCUMENTS

| | | | | |
|---|---|---|---|---|
| 2013/0163171 | A1* | 6/2013 | Fujiwara | G06F 1/203 |
| | | | | 361/679.19 |
| 2013/0235525 | A1* | 9/2013 | Hata | H05K 7/20154 |
| | | | | 361/697 |
| 2013/0327507 | A1* | 12/2013 | Degner | G06F 1/203 |
| | | | | 165/120 |
| 2013/0329357 | A1* | 12/2013 | Degner | G06F 1/203 |
| | | | | 361/679.47 |
| 2014/0041827 | A1* | 2/2014 | Giaimo, III | G06F 1/3234 |
| | | | | 165/11.1 |
| 2014/0078669 | A1* | 3/2014 | Ooe | G06F 1/203 |
| | | | | 361/679.47 |
| 2014/0111926 | A1* | 4/2014 | Reid | G06F 1/203 |
| | | | | 361/679.09 |
| 2014/0118937 | A1* | 5/2014 | Adrian | H05K 7/20172 |
| | | | | 361/695 |
| 2015/0212556 | A1* | 7/2015 | Hrehor, Jr | H05K 7/20809 |
| | | | | 361/679.48 |
| 2015/0341072 | A1* | 11/2015 | Lai | H04M 1/026 |
| | | | | 455/575.8 |
| 2016/0165751 | A1* | 6/2016 | Varadarajan | H05K 7/20136 |
| | | | | 165/80.2 |
| 2017/0041703 | A1* | 2/2017 | Herold | H04R 1/028 |
| 2020/0352051 | A1* | 11/2020 | He | G06F 1/20 |
| 2021/0072805 | A1* | 3/2021 | He | G06F 1/203 |
| 2021/0243925 | A1* | 8/2021 | Ramasamy | H05K 9/0015 |

* cited by examiner

COOLING SYSTEM FOR AN INFORMATION HANDLING SYSTEM

FIELD OF THE DISCLOSURE

The instant disclosure relates to information handling systems. More specifically, portions of this disclosure relate to a cooling system for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, information handling systems have been created as lightweight, personal, portable devices, commonly known as a tablet. As the popularity of such devices has risen, so has the demand for increased capability of their information handling system components, including, for example, processing speed, connectivity, graphics, and displays. More powerful components often generate more heat as a by-product of their increased performance and consequently demand more robust thermal dissipation solutions. However, tablets and other compact information handling systems have limited space relative to larger, traditional mobile information handling systems like laptop computers. In addition, touchscreen devices like tablets are designed to be held by a user during use and are therefore thermally constrained not only by the thermal limits of the information handling system components but also by the acceptable thermal limits of the user.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits, and be used in other applications, than those described above.

SUMMARY

Unlike traditional methods of thermal dissipation for less compact mobile information handling systems, like laptop computers, a compact and mobile information handling system, such as a tablet, may include a thermally-configured chassis having one or more fans and one or more inlets for directing air flow directly across components of the information handling system to cool such components by convection. Such fan(s) may additionally direct air flow across a heat exchanger and/or heat pipe coupled to heat-producing components like a central processing unit and/or graphics processing unit. For example, such a fan may be a dual opposite outlet fan, as described in U.S. Pat. No. 10,584,717 ("DOO fan"). Components of the information handling system may be positioned on the thermally-configured chassis and used to efficiently direct the air flow throughout the chassis without requiring additional space. For example, an audio system speaker of the information handling system may be positioned in the inlet air path so that such path can be used not only for directing air to a fan but also as a sound chamber for the speaker. In addition, the chassis may be configured to meet thermal requirements unique to a tablet. For example, the inlet(s) and outlet(s) may be positioned on one or more sides of the tablet. Such inlet(s) and outlet(s) cannot be practically positioned on the top of the tablet because that surface is reserved for an interactive screen, such as an LCD touchscreen. Likewise, the inlet(s) and the outlet(s) cannot be practically positioned on the back of the tablet because such inlet(s) and/or outlet(s) may be blocked if the back of the tablet is placed on a flat surface during use. As another example, the thermally-configured chassis may include a battery along its bottom half and a fan near each of its upper corners such that those areas of the chassis are kept cool relative to components of the information handling system positioned in the upper-middle of the tablet (i.e., where users rarely touch the information handling system).

According to one embodiment, there is an information handling system chassis having a top and a bottom connected by one or more sides and one or more fans positioned between the top and bottom. The fans may be configured to receive air from outside the chassis and deliver the air to components of the information handling system to cool them by convection. For example, the fans may be DOO fans and/or may direct air across heat-producing components like a CPU or GPU. The chassis may include one or more inlets positioned on the side(s) for receiving the air for the fan(s). The chassis may also include a gasket for directing the air between the inlet(s) and the fan(s). One or more audio system components, such as a speaker, may be positioned within the gasket(s). Each fan may direct the air not only across components of the information handling system, but also across a heat exchanger and/or heat pipe coupled to heat-producing components like a CPU or GPU before the air is discharged through one or more outlet. The outlet(s) can be positioned on a side of the chassis. Antenna components, such as those with WiFi or LTE functionality, may be positioned adjacent to the outlet(s) and may be formed such that the antenna components direct the air out of the chassis. Buttons and other external components (e.g., ports) of the information handling system may be of a low profile to permit space for the inlet(s) and outlet(s). In some embodiments, there are two fans, with one positioned generally in an upper right corner of the chassis and the other positioned generally in an upper left corner of the chassis such that these areas are kept relatively cool compared to the upper-middle of the chassis (i.e., where users touch the information handling system less often). In some embodiments, significant heat-producing components, such as CPUs and GPUs are positioned on the upper-middle of the chassis and, if the chassis includes two fans as just provided, between the fans.

In some embodiments, a battery is positioned on the lower half of the chassis between the top and bottom.

Some embodiments include a method for receiving and directing air through the chassis and for discharging the air from the chassis using the apparatus(es) just described. The method may be embedded in a computer-readable medium as computer program code comprising instructions that cause a processor to perform the steps of the method.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings. Elements within each FIGURE are generally drawn to scale relative to other elements in the same FIGURE.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
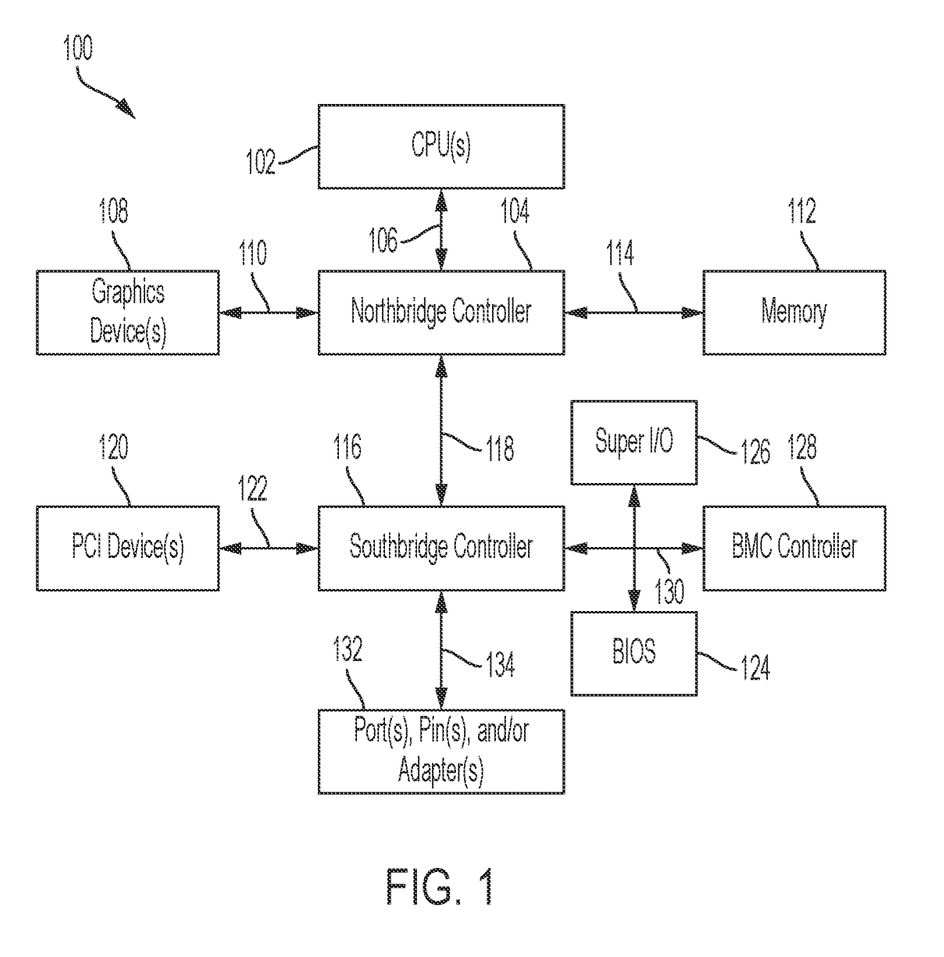
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

IHS 100 may be configured to access different types of computer-accessible media separate from memory 112. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 100 through various interfaces, such as universal serial bus (USB) interfaces, via northbridge controller 104 and/or southbridge controller 116. Some such mediums may be coupled to the IHS through a Super I/O Controller 126 which combines interfaces for a variety of lower bandwidth or low data rate devices. Those devices may include, for example, floppy disks, parallel ports, keyboard and mouse and other user input devices, temperature sensors, and/or fan speed monitoring.

BIOS 124 may include non-volatile memory having program instructions stored thereon. The instructions stored on the BIOS 124 may be usable by CPU(s) 102 to initialize and test other hardware components. The BIOS 124 may further include instructions to load an Operating System (OS) for execution by CPU(s) 102 to provide a user interface for the IHS 100, with such loading occurring during a pre-boot stage. In some embodiments, firmware execution facilitated by the BIOS 124 may include execution of program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and/or manage BMC controller 128. Further, the BMC controller 128 may allow a user to setup configuration options, resolve and administer hardware or software problems, etc. Additionally or alternatively, BMC controller 128 may include one or more firmware volumes, each volume having one or more firmware files used by the BIOS firmware interface to initialize and test components of IHS 100.

One or more of the devices or components shown in FIG. 1 may be absent, or one or more other components may be added. Further, in some embodiments, components may be combined onto a shared circuit board and/or implemented as a single integrated circuit (IC) with a shared semiconductor substrate. For example, northbridge controller 104 may be combined with southbridge controller 116, and/or be at least partially incorporated into CPU(s) 102. Accordingly, systems and methods described herein may be implemented or executed with other computer system configurations. In some cases, various elements shown in FIG. 1 may be mounted on a motherboard and enclosed within a chassis of the IHS 100.

Figure 2:
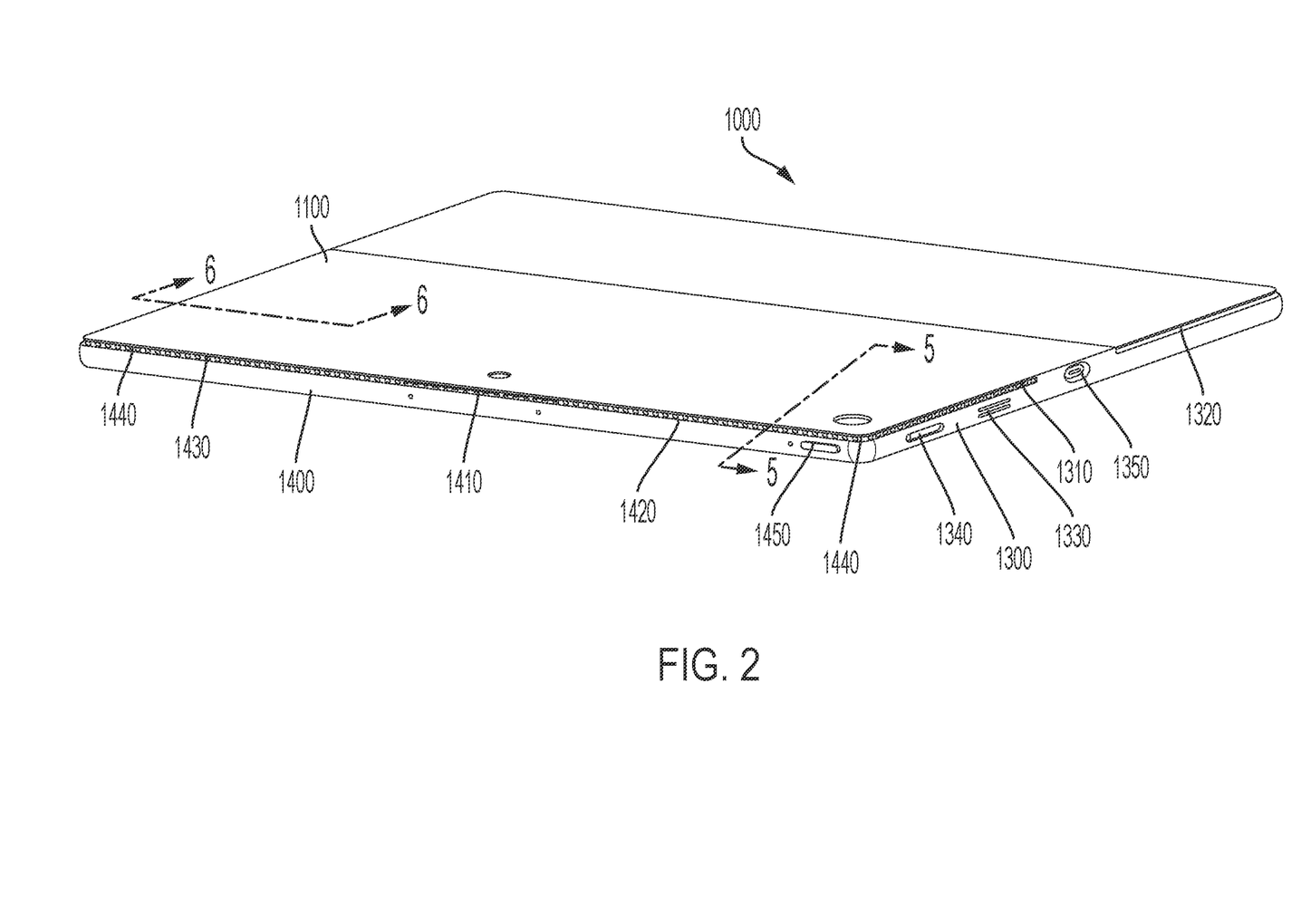
FIG. 2 is a bottom perspective view of an example information handling system having a fan and side inlet according to some embodiments of the disclosure.

FIG. 2 depicts a compact, mobile information handling system with an interactive touchscreen, commonly referred to a tablet. IHS 1000 includes a chassis having bottom 1100 and a top 1200 (shown in FIG. 7) that are connected by four sides 1300, 1400, 1500, and 1600. Side 1300 includes an inlet 1310. Inlet 1310 is positioned only on a portion of side 1300 so that other external components of IHS 1000 may also be positioned on side 1300. For example, as shown, side 1300 includes a hinged stand 1320 (e.g., for supporting IHS 1000 in an upright position on a surface), low profile audio slots 1330 (e.g., for permitting sound from internal speakers to exit the chassis), low profile port 1340 (e.g., a SIM card slot), and port 1350 (e.g., a power port). Side 1300 is connected to side 1400. Side 1400 may include one or more outlets 1410, 1420, 1430 (alternatively, outlets 1410, 1420, and 1430 may be unitary). Like inlet 1300, outlets 1410, 1420, 1430 may be positioned only on a portion of side 1400 to permit positioning on side 1400 of other external components of IHS 1000, such as button 1450 (e.g., a power button). The inlets and outlets may be sealed at portions, for example, at portion 1440 between inlet 1310 and outlet 1420 (and, optionally, between outlets 1420 and 1410, and 1410 and 1430).

Figure 3:
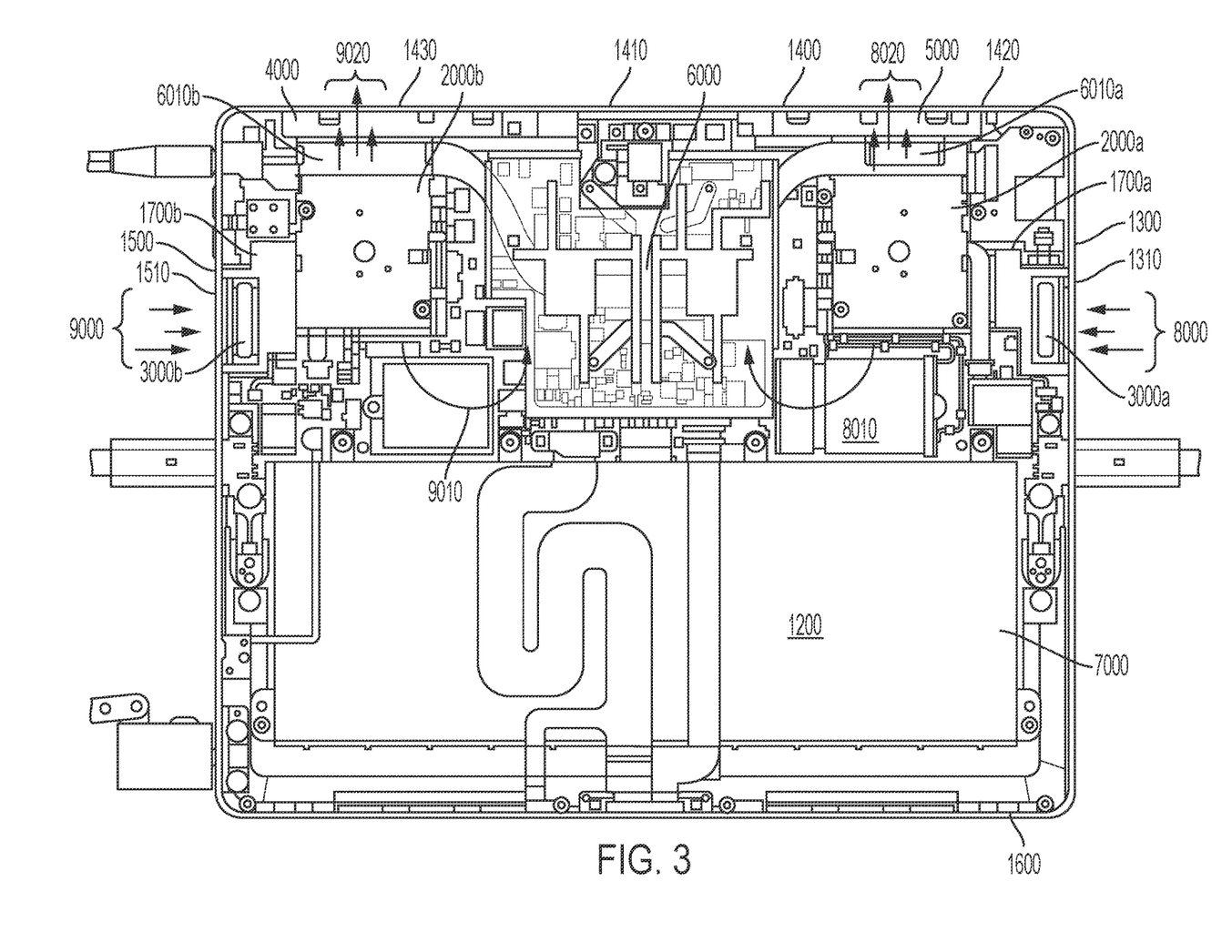
FIG. 3 is a cross-sectional top view of the information handling system of FIG. 2.

As shown more clearly in FIG. 3, side 1500 may be arranged similarly to side 1300 and include an inlet 1510 along a similar portion of side 1500. There are four primary sections of IHS 1000: (a) a lower section comprised almost entirely of a battery 7000, (b) an upper middle section comprising IHS processing components 6000, such as a CPU or GPU, and an outlet 1410, (c) an upper right section comprising inlet 1310, gasket 1700*a*, audio component 3000*a* (e.g., a speaker), fan 2000*a*, outlet 1420, and antenna component 5000 (e.g., an antenna with LTE functionality), and (d) an upper left section comprising inlet 1510, gasket 1700*b*, audio component 3000*b* (e.g., a speaker), fan 2000*b*, outlet 1430, and antenna component 4000 (e.g., an antenna with WiFi functionality).

Figure 4:
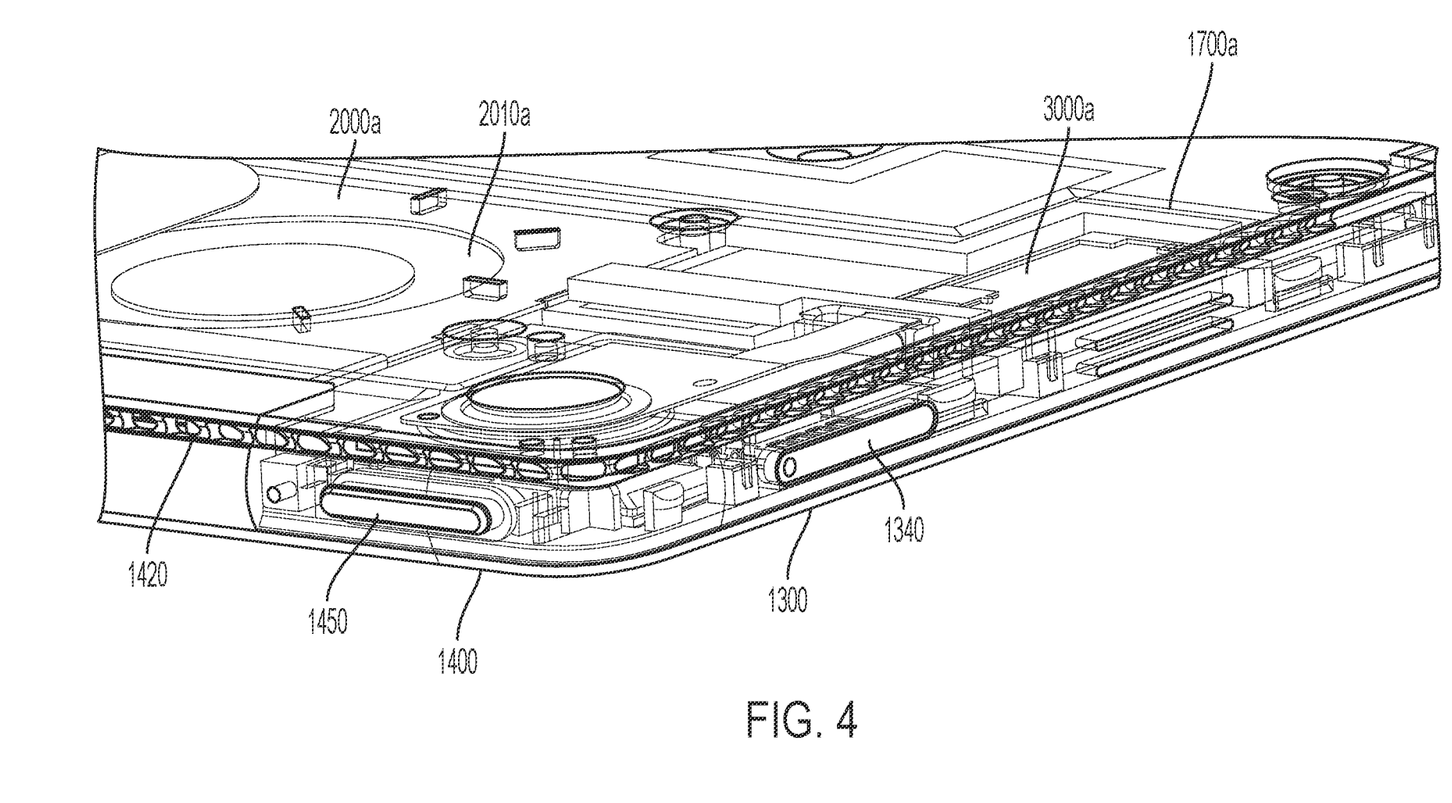
FIG. 4 is a partial cross-sectional perspective view of a portion of FIG. 2.
Figure 5:
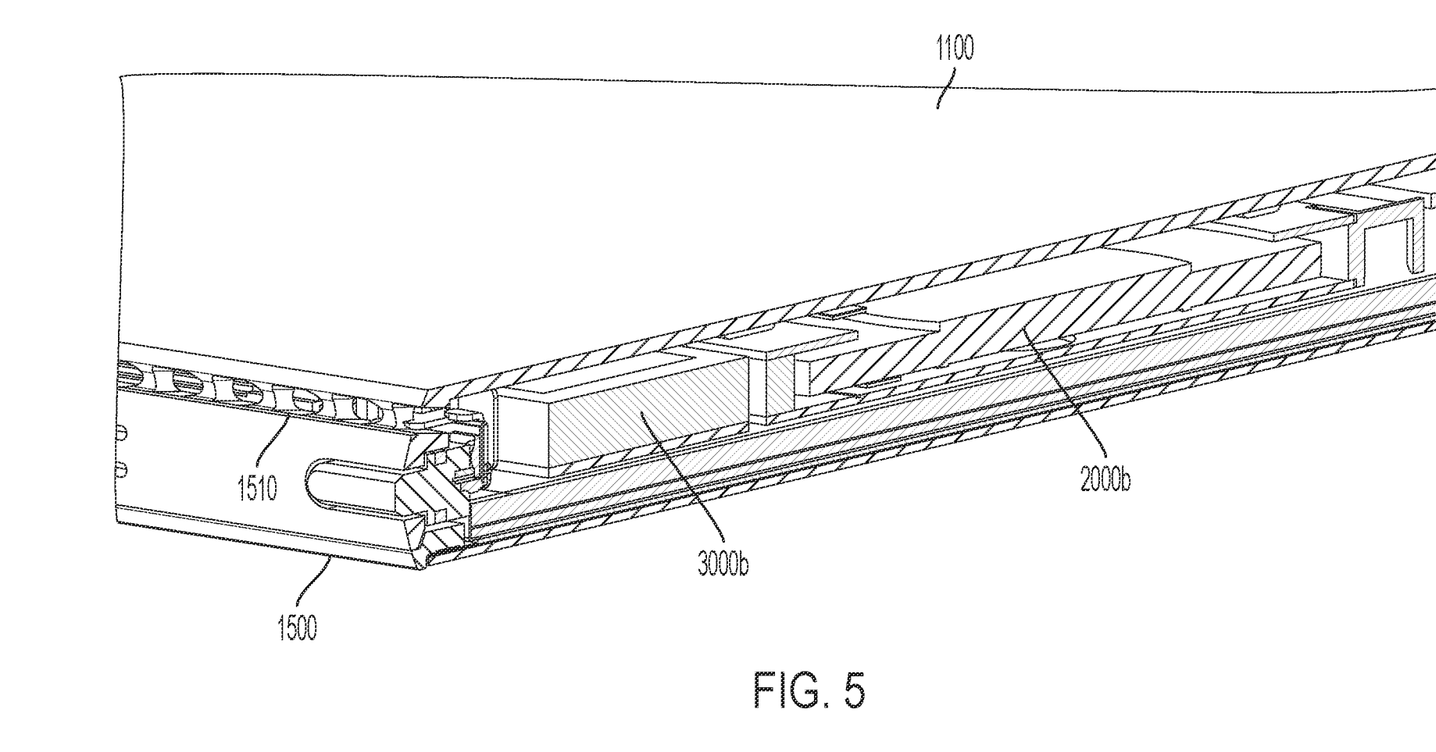
FIG. 5 is a partial cross-sectional perspective view along the line 5-5 of FIG. 2.
Figure 6:
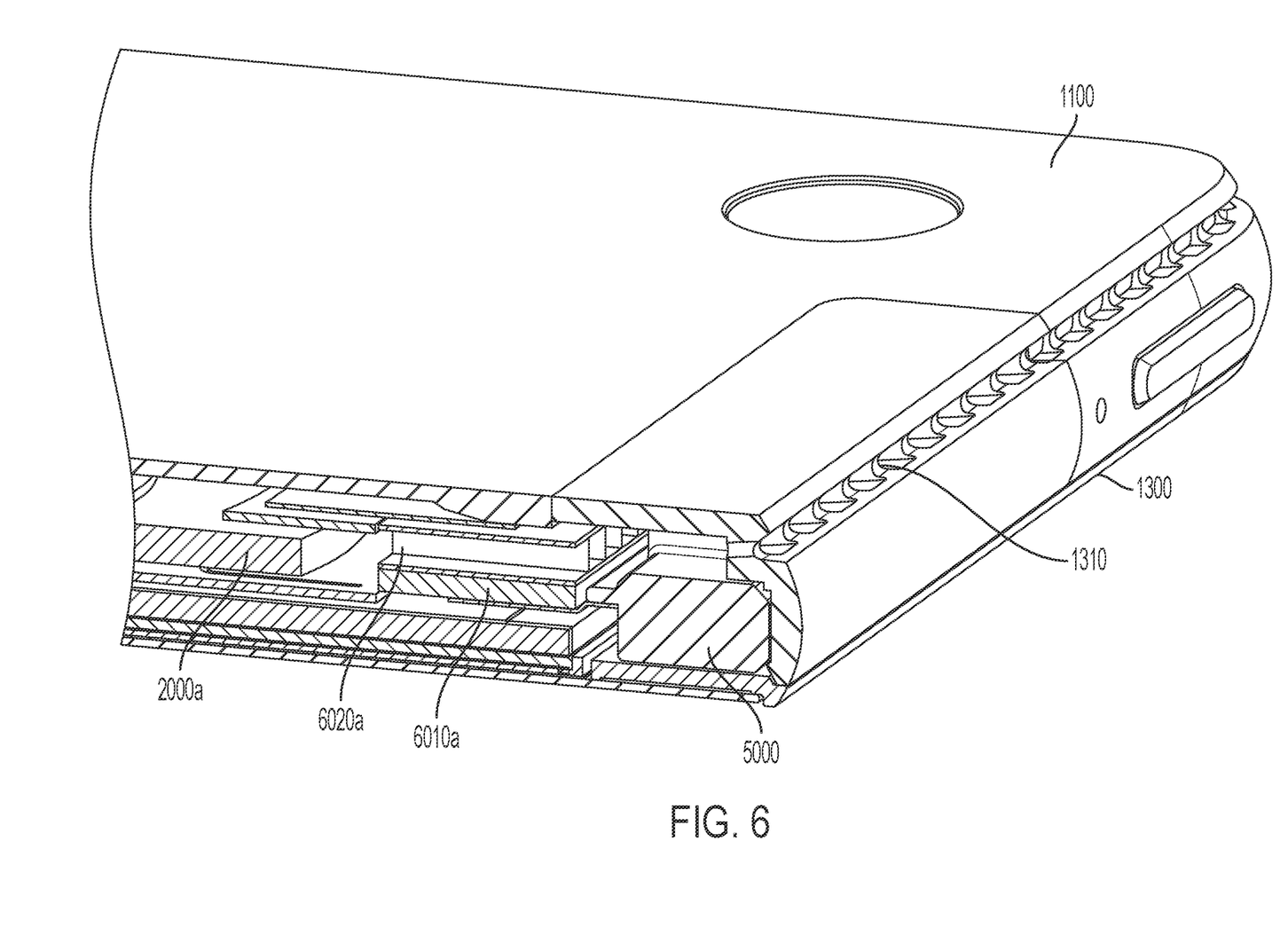
FIG. 6 is a partial cross-sectional perspective view along the line 6-6 of FIG. 2.

In operation, inlet 1310 may receive a first quantity of air 8000 into the chassis that is directed to fan 2000a by gasket 1700a. Air 8000 is received through fan inlet 2010a (shown more clearly in FIG. 4) and discharged by fan 2000a through the chassis in two different directions 8010 and 8020. The portion of air 8000 discharged in direction 8010 flows directly across components 6000 of IHS 1000, such as a CPU and/or GPU, to cool them by convection. Components of the IHS, such as battery 7000 may be positioned within the chassis of IHS 1000 to direct the flow of this portion of air. This portion of air 8000 is then discharged from the chassis of IHS 1000 through outlet 1410. The portion of air 8000 discharged in direction 8020 flows across a heat pipe 6010a and/or heat exchanger 6020a (shown more clearly in FIG. 6). Heat pipe 6010a is thermally coupled to heat-generating components of IHS 1000, such as a CPU and/or GPU, positioned in the upper middle of the chassis. The portion of air 8000 discharged in direction 8020 is then discharged from the chassis of IHS 1000 through outlet 1420.

The components in the upper left section of IHS 1000 function similarly. Inlet 1510 may receive a first quantity of air 9000 into the chassis that is directed to fan 2000b by gasket 1700b. Air 9000 is received through fan inlet 2010b (not shown but substantially the same as fan inlet 2010a) and discharged by fan 2000b through the chassis in two different directions 9010 and 9020. The portion of air 9000 discharged in direction 9010 flows directly across components 6000 of IHS 1000, such as a CPU and/or GPU, to cool them by convection. Components of the IHS, such as battery 7000 may be positioned within the chassis of IHS 1000 to direct the flow of this portion of air. This portion of air 9000 is then discharged from the chassis of IHS 1000 through outlet 1410. The portion of air 9000 discharged in direction 9020 flows across a heat pipe 6010b and/or heat exchanger 6020b (not shown but substantially the same as heat pipe 6010a and heat exchanger 6020b). Heat pipe 6010b is thermally coupled to heat-generating components of IHS 1000, such as a CPU and/or GPU, positioned in the upper middle of the chassis. The portion of air 9000 discharged in direction 9020 is then discharged from the chassis of IHS 1000 through outlet 1430.

In the embodiment of IHS 1000, fans 2000a and 2000b are each a DOO fan. As explained more fully in U.S. Pat. No. 10,584,717, a DOO fan may improve efficiency by having many thin fan blades that are relatively larger than the fan body. Additionally, DOO fans include two outlets, rather than just one, which allows the fan to include a large fan impeller. Further details of DOO fans may be found in U.S. Pat. No. 10,584,717.

Figure 7:
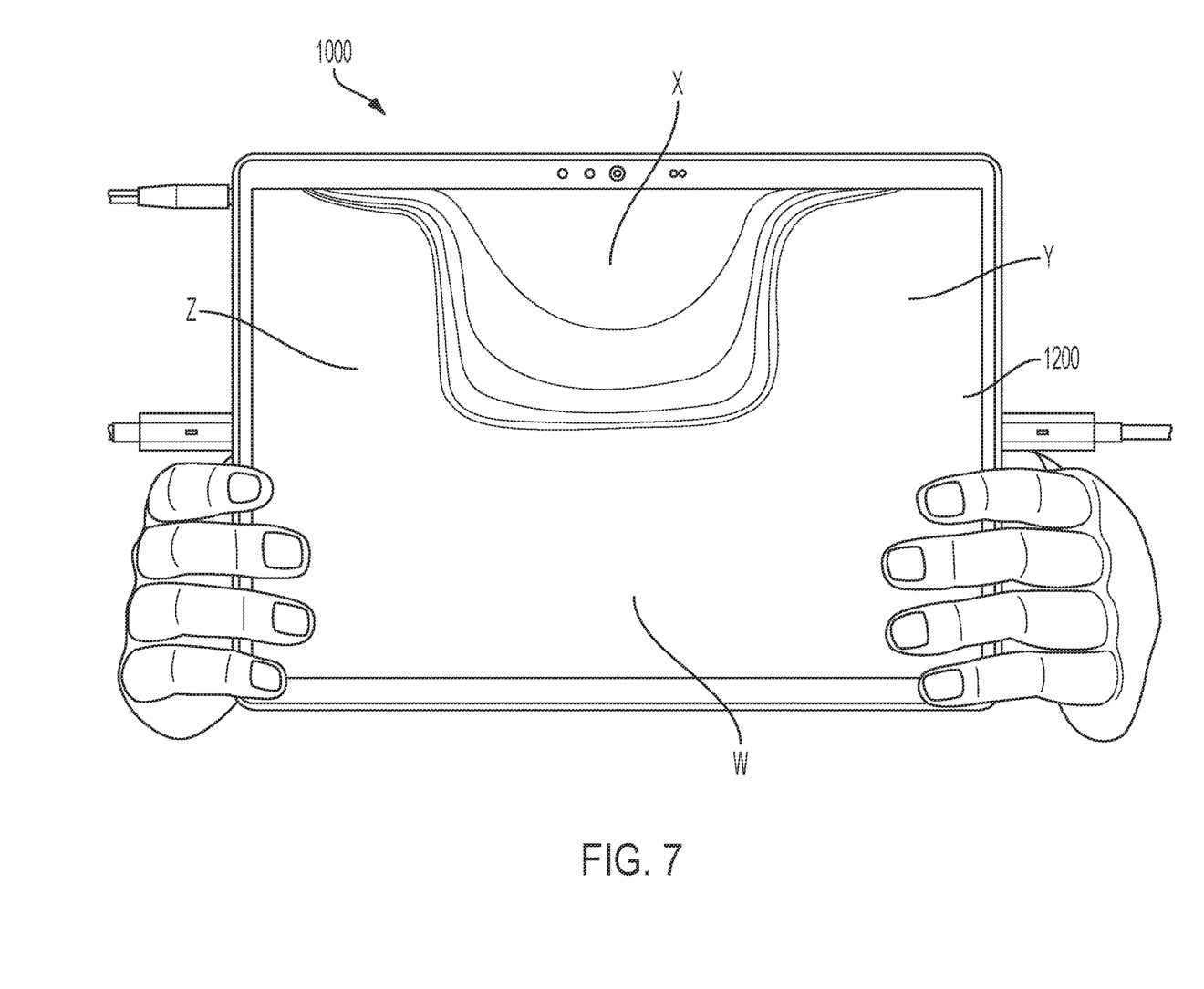
FIG. 7 is a representative thermal image plot of a top perspective view of an information handling system according to some embodiments of the disclosure.

Gaskets 1700a and 1700b are shaped to not only direct quantities of air 8000 and 9000 to fans 2000a, 2000b, respectively; they also form sound chambers for audio components of IHS 1000, such as speakers 3000a, 3000b. Similarly, antennas 4000 and 5000 are shaped to direct air from fans 2000b, 2000a to outlets 1420, 1430, respectively. These configurations allow the chassis of IHS 1000 to remain compact despite the inclusion of additional thermal dissipation components, like a second fan and gaskets. As a result, IHS 1000 can remain compact and mobile while including more powerful, but also more heat-generating, components, such as more powerful processing components 6000 and other components (such as more powerful antennas 4000, 5000 and more powerful speakers 3000a, 3000b). The thermal configuration just described also provides a better user experience. As shown in FIG. 7, the IHS 1000 has a thermal profile (shown in contour lines) across four primary sections W, X, Y, and Z that generally correspond to the lower, upper middle, upper right, and upper left sections described above. As a result of the thermal dissipation features just described, at least sections X, Y, and Z (and in some cases section W) are relatively cooler to the touch than they would be otherwise (i.e., as a result of the fans 2000a, 2000b discharging air across the IHS components in the manner described above). It is particularly advantageous to cool section Y and Z because these (in addition to section W) are the areas of IHS 1000 that are most often touched by a user during operation of IHS 1000 (in contrast to section X). If, for example, fan 2000b were not included in IHS 1000, section X would have a hotter heat profile than shown in FIG. 7 (because only one fan would be directing cool air across it) and section Z would have a profile similar to (or worse) than that of that section X.

Figure 8:
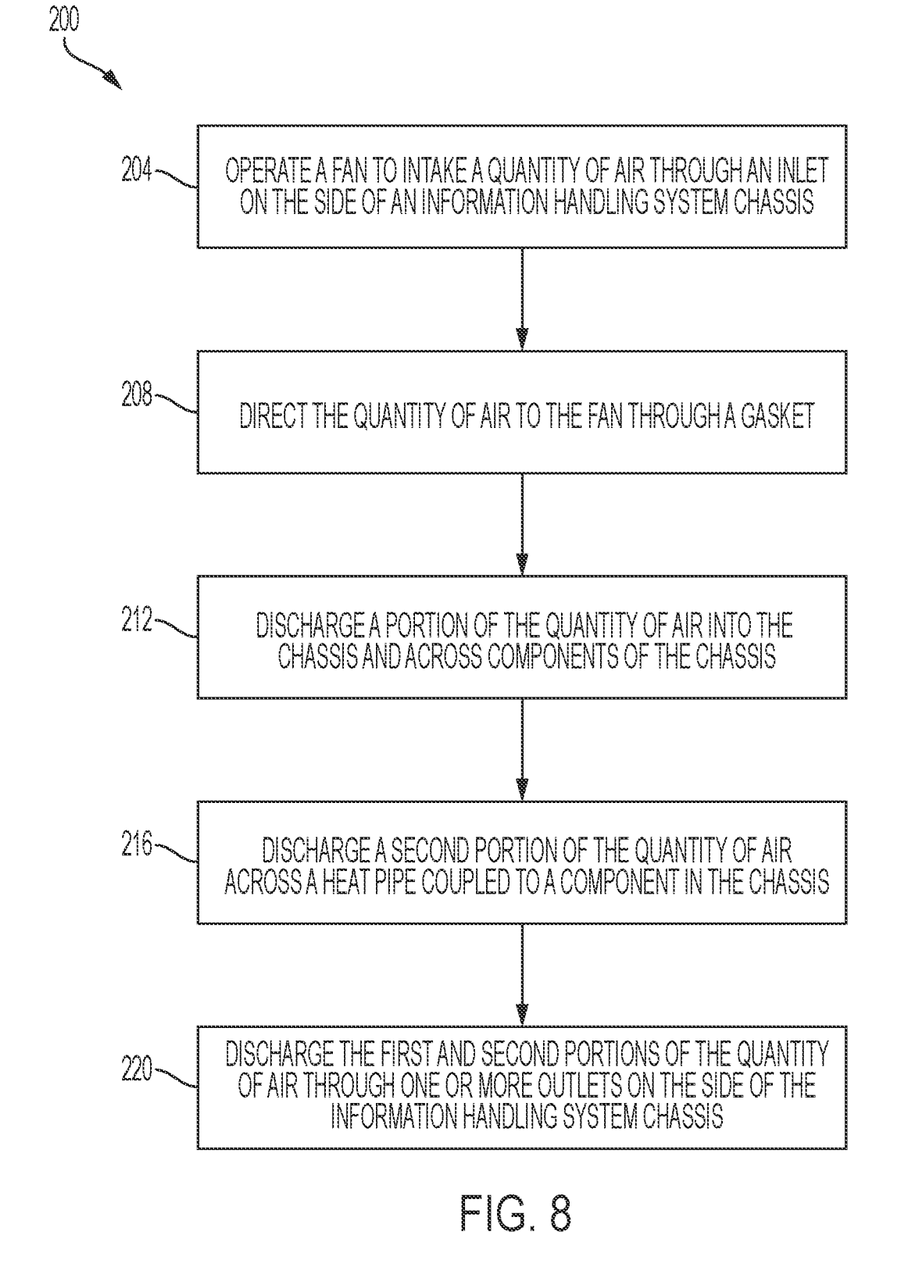
FIG. 8 is a flow chart illustrating a method for cooling components of an information handling system according to some embodiments of the disclosure.

Turning now to FIG. 8, which is a flow chart illustrating a method 200 of cooling components of an IHS, such as IHS 1000. In step 204, the IHS operates a fan to intake a quantity of air through an inlet positioned on the side of the IHS chassis (and, in some embodiments, not on the top or bottom of the chassis). In step 208, the quantity of air is guided to the fan by an gasket on the IHS chassis that is positioned between the inlet and the fan. In step 212, the fan discharges a first portion of the quantity of air into the chassis and across components of the chassis, such as heat-producing components like a CPU and/or GPU, to cool such components by convection. In step 216, the fan discharges a second portion of the quantity of air across a heat pipe that is coupled to components of the chassis, such as heat-producing components likes a CPU and/or GPU, to cool the heat pipe (and/or a heat sink coupled thereto). In step 220, the quantity of air is discharged, after cooling the components and heat pipe, through one or more outlets positioned on the a side of the IHS (and, in some embodiments, not on the top or bottom of the chassis). In some embodiments, this method is performed continuously while the IHS is in operation. In some embodiments, a second, second inlet, and second gasket are used in the IHS to perform this same method.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:
1. An apparatus, comprising:
an information handling system chassis having a top and a bottom, the top and bottom connected by a first side;
a first fan positioned between the top and bottom on the information handling system chassis, the first fan configured to receive a first quantity of air from outside the information handling system chassis and deliver the first quantity of air to components positioned on the information handling system chassis to cool the components by convection;
a first inlet positioned on the first side, the first inlet configured to receive the first quantity of air;
a first gasket positioned between the top and bottom on the information handling system chassis, the first gasket defining a first passageway configured to direct the first quantity of air from the first inlet to the first fan; and
a first audio system component positioned in the first passageway.

2. The apparatus of claim 1, wherein: the first fan is a dual opposite outlet fan having a first air outlet configured to deliver a first portion of the first quantity of air in a first direction and a second air outlet configured to deliver a second portion of the first quantity of air in a second direction; and the top of the information handling system chassis includes a touchscreen such that the first fan is positioned between the touchscreen and the bottom of the information handling system chassis.

3. The apparatus of claim 1, further comprising a first antenna component positioned between the top and bottom of the information handling system chassis and positioned within a second passageway that extends from the first fan to an outlet of the information handling system chassis.

4. The apparatus of claim 1, further comprising:
a second side connecting the top and bottom, the second side adjacent to the first side; and
an outlet positioned on the second side, the outlet configured to permit discharge of the first quantity of air from the information handling system chassis.

5. The apparatus of claim 4, further comprising a first antenna component adjacent to the outlet and between the top and bottom on the information handling system chassis, the first antenna configured to direct the first quantity of air from the first fan to the outlet.

6. The apparatus of claim 1, further comprising:
a second side connecting the top and bottom;
a second fan positioned between the top and bottom on the information handling system chassis, the second fan configured to receive a second quantity of air from outside the information handling system chassis and deliver the second quantity of air to components positioned on the information handling system chassis to cool the components by convection;
a second inlet positioned on the second side, the second inlet configured to receive the second quantity of air; and
a second gasket positioned between the top and bottom on the information handling system chassis, the second gasket defining a second passageway configured to direct the second quantity of air from the second inlet to the second fan.

7. The apparatus of claim 6, where the second fan is a dual opposite outlet fan.

8. The apparatus of claim 6, further comprising:
a second audio system component positioned in the second passageway;
a third side connecting the top and bottom, the third side connecting the first side and the second side;
an outlet positioned on the third side, the outlet configured to permit discharge of the second quantity of air from the information handling system chassis; and
a second antenna component positioned adjacent to the outlet and between the top and bottom on the information handling system chassis, the second antenna configured to direct the second quantity of air from the second fan to the outlet.

9. The apparatus of claim 6, further comprising a central processing unit component or a graphics processing unit component positioned on the information handling system chassis between the first fan and second fan and between the top and bottom, at least one of the first and second fans configured to deliver a quantity of air to the central processing unit or the graphics processing unit to cool it by convection.

10. A method, comprising:
receiving a first quantity of air through a first inlet positioned on a first side of an information handling system chassis, the first side connecting a top and a bottom of the information handling system chassis;
directing the first quantity of air through a first passageway defined by a first gasket to a first fan positioned on the information handling system chassis between the top and bottom; and
directing the first quantity of air through a second passageway from the first fan to an outlet of the information handling system chassis, a first antenna component positioned in the first passageway; and
discharging the first quantity of air through the outlet.

11. The method of claim 10, further comprising directing with the first fan the first quantity of air across components positioned on the information handling system chassis to cool the components by convection, where the first fan is a dual opposite outlet fan.

12. The method of claim 10, where the outlet is positioned on a second side of the information handling system chassis, the second side connecting the top and the bottom and being adjacent to the first side.

13. The method of claim 10, further comprising directing a second quantity of air through a third passageway defined by a second gasket to a second fan positioned on the information handling system chassis.

14. The method of claim 13, further comprising:
receiving the second quantity of air through a second inlet positioned on a third side of the information handling system chassis, the third side connecting the top and the bottom.

15. The method of claim 14, further comprising directing with the second fan the second quantity of air across components positioned on the information handling system chassis to cool the components by convection.

16. The method of claim 14, further comprising discharging the second quantity of air through an outlet positioned on a second side of the information handling system chassis, the second side connecting the top and the bottom and being adjacent to the first side.

17. The method of claim 16, further comprising directing the second quantity of air through a fourth passageway from the second fan to the outlet, a second antenna component positioned in the fourth passageway.

18. An information handling system, comprising:
a chassis having a top and a bottom, the top and bottom connected by a first side and a second side, the first side adjacent to the second side;
a first fan positioned between the top and bottom on the chassis, the first fan configured to receive a first quantity of air from outside the chassis and deliver the first quantity of air to components of the information handling system to cool the components by convection;
a second fan positioned between the top and bottom on the chassis, the second fan configured to receive a second quantity of air from outside the chassis and deliver the second quantity of air to components of the information handling system to cool the components by convection;

a first inlet positioned on the first side, the first inlet configured to receive the first quantity of air;

a first gasket positioned between the top and bottom on the chassis, the first gasket configured to direct the first quantity of air from the first inlet to the first fan; and a second gasket positioned between the top and bottom on the chassis, the second gasket configured to direct the second quantity of air from a second inlet to the second fan.

19. The information handling system of claim 18, further comprising:

a third side connecting the top and the bottom, the second side connecting the first side and the third side the second inlet positioned on the third side and configured to receive the second quantity of air; and an outlet positioned on the second side, the outlet configured to permit discharge of the first quantity of air from the chassis, where the outlet is further configured to permit discharge of the second quantity of air from the chassis.

20. The information handling system of claim 19, further comprising a central processing unit or a graphics processing unit positioned between the first fan and the second fan on the chassis, at least one of the first and second fans configured to deliver a quantity of air to the central processing unit or the graphics processing unit to cool it by convection.

* * * * *